UNITED STATES PATENT OFFICE.

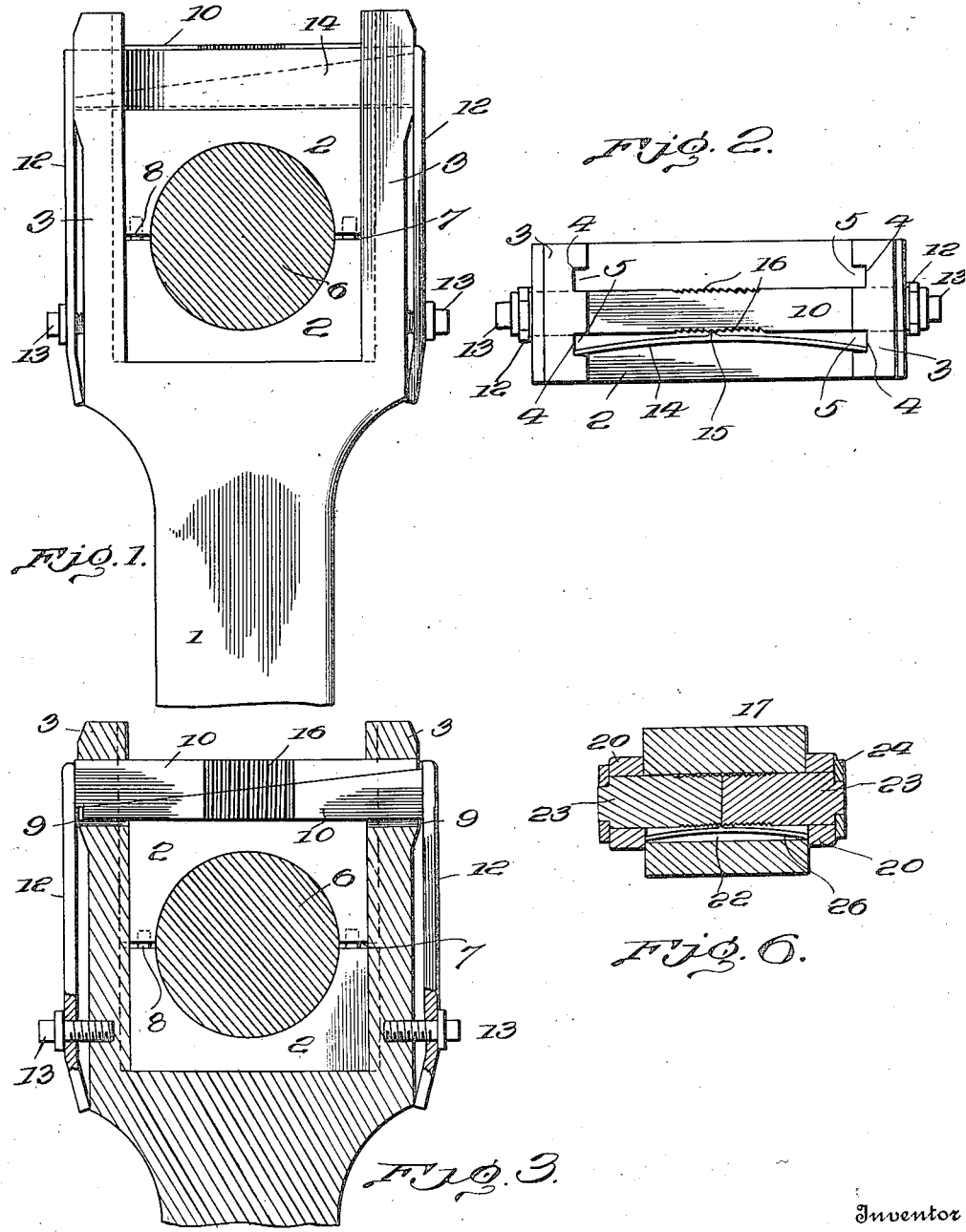

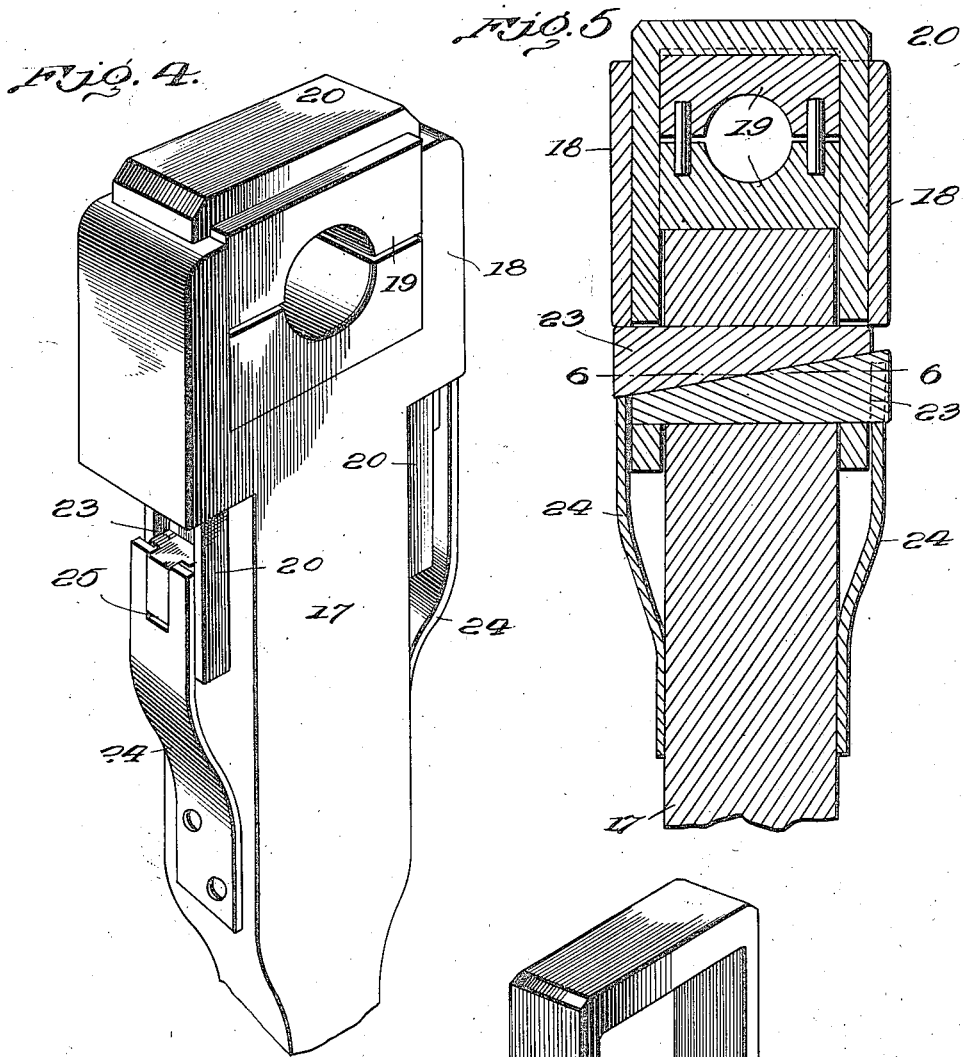

ANNA C. HALMRAST, OF WARNER, ALBERTA, CANADA.

ADJUSTABLE BEARING.

1,174,857.    Specification of Letters Patent.    Patented Mar. 7, 1916.

Application filed December 3, 1914. Serial No. 875,372.

*To all whom it may concern:*

Be it known that I, ANNA C. HALMRAST, subject of the King of Great Britain, residing at Warner, Province of Alberta, Canada, have invented certain new and useful Improvements in Adjustable Bearings, of which the following is a specification.

This invention relates to bearings for rotating shafts or similar mechanical elements and has for its object the provision of simple and efficient means whereby the wear upon the bearing surfaces will be taken up and a proper fit between the rotating member and the parts between which it is journaled will be maintained throughout the life of the apparatus.

The invention also seeks to provide a device for the stated purpose in which binding of the rotating member against the bearing therefor will be prevented without interfering with the automatic and compensating adjustment of the same.

The invention also seeks to provide a device for the stated purpose which will be capable of application to any bearing and which may be produced and maintained at a low cost.

The several stated objects, and such other objects as will appear from the following description are attained in mechanism of the character illustrated in the accompanying drawings and the invention resides in certain novel features which will be particularly pointed out in the claims following the description.

In the drawings, Figure 1 is an elevation of my improved bearing. Fig. 2 is an edge view of the same. Fig. 3 is a longitudinal section. Fig. 4 is a perspective view of a different application of the invention. Fig. 5 is a longitudinal section of the same. Fig. 6 is a transverse section on the line 6—6 of Fig. 5. Fig. 7 is a detail perspective view of the adjusting keys or wedges. Fig. 8 is a detail perspective view of a yoke employed in the embodiment of the invention illustrated in Figs. 4 and 5.

In the drawings, the reference numeral 1 indicates a support for the bearing members 2 and this support may be a fixed frame, a shaft hanger, a pitman or other member in which a bearing for a rotating shaft is ordinarily mounted. In the present drawings, the support 1 is shown constructed with a forked end, the members 3 of the fork being grooved, as shown at 4, in their opposed faces to receive ribs 5 on the edges of the bearing members 2. These bearing members are thus slidably fitted in the support and may be moved toward or from each other to be adjusted around the shaft 6 as will be readily understood. The bearings 2 may be of any desired material and are of the usual form, being of such size that a slight space indicated at 7, will be left between their meeting edges so as to permit the bearings to be moved toward each other as the bearing surfaces wear. The ribs 5 engaging the grooves 4 serve to prevent twisting of the bearings relative to each other and to the shaft, and dowel pins or similar devices, indicated at 8, are provided at the opposed edges of the bearings to further prevent such relative twisting. The fork members 3 are provided near their extremities with longitudinal slots 9 and opposed keys or wedges 10 are inserted through the said slots so as to bear against the outer end walls of the same and the outer side of the adjacent bearing member 2. It will be readily understood that if these wedges be moved longitudinally upon each other they will act upon the adjacent bearing member to force the same more closely around the shaft and consequently will hold the said member in proper relation to the shaft so that a firm bearing for the same will be provided and the wear between the opposed surfaces taken up. The wedges are provided at their larger butt ends with lugs or tongues 11 having parallel sides and these tongues or lugs 11 are engaged by the notched or slotted free ends of springs 12 which are secured to the sides of the support and bear upon the outer larger ends of the wedges so as to press them inwardly against each other and hold them in engagement with the support and the bearing member. The supports 12 are resilient plates which extend longitudinally of the support and, in the form of the invention shown in Figs. 1 and 3, they are secured to the support by screws or bolts 13 inserted through them and into the sides of the support as clearly shown. The tension of the springs may thus be readily adjusted and should a spring be broken it may be easily removed and a new spring substituted therefor. It will be understood that when the parts are initially assembled the wedges or keys will be arranged so that their butt ends will project somewhat beyond the sides of the support and the bearing members 2 will be out of contact at their opposed edges as indicated at 7. As the bearing surfaces are worn away through long continued use the resiliency of the springs will force the wedges inwardly and the outer bearing member will be thereby moved toward the shaft so as to automatically compensate for the wear. After the bearing members have been moved into contact with each other the parts should be removed and a liner or filler inserted so as to permit further use of the worn bearings.

In order to prevent the springs moving the wedges inwardly so rapidly and with such force that the bearing members will bind upon the shaft I provide a retarding device which is illustrated as consisting of a leaf spring 14 having its ends fitted in the grooves 4 of the support adjacent the slots 9 and provided between its ends with a tooth or projection 15 adapted to engage notches 16 formed in the sides of the keys or wedges 10. This retarding spring offers additional resistance to the action of the presser springs 12 and prevents the wedges being forced inwardly so rapidly and to such an extent as to cause the bearing members to bind around the shaft. As the bearing surfaces, however, are worn they will offer less resistance to the action of the presser springs 12 and the holding effect of the tooth 15 will then be overcome so that the wedges will be free to move inwardly under the influence of the presser springs.

In the arrangement illustrated in Figs. 1, 2 and 3 the adjusting keys or wedges are located at the outer end of the support but it may sometimes be desirable to have the wedges at the opposite side of the bearing members and the arrangement shown in Figs. 4 and 5 is designed more especially for this purpose. In this arrangement, the supporting frame is indicated by the reference numeral 17 and is constructed with a fork 18 at its end to receive the bearing members 19 as shown. The bearing members are fitted in the fork 18 so as to be capable of a limited sliding movement therein but in this embodiment of the invention the ribs 5 are omitted. The side members of the fork are constructed each with a wide groove in its inner face and a yoke 20 is fitted in these grooves, the outer portion of the yoke bearing against the outer side of the outer bearing member 19. The side members of this yoke extend through the sides of the fork 18 and bear against the sides of the frame 17 below the fork, as shown clearly in Figs. 4 and 5, and they are further provided adjacent their ends with longitudinal slots 21 which are adapted to register with a slot 22 provided in the said frame. The wedges or keys 23 are identical in construction with those previously described and illustrated in Fig. 7 and are inserted through the slots 21 and the slot 22 in the frame so as to bear against the outer side wall of the slot of the frame and the inner end walls of the slots in the yoke. The presser springs 24 are secured to the sides of the frame below the yoke and their upper notched ends 25 engage the lugs on the butt ends of the wedges as shown and as will be readily understood. This arrangement operates in the same manner as the previously described arrangement except that the pressure exerted by the wedges is directed upon the yoke so as to pull the yoke longitudinally inward upon the supporting frame and thereby move the outer bearing member to and against the shaft. The retarding spring 26 is fitted in the slot 22 in the supporting frame between one side wall of said slot and the wedges and is identical in construction and operation with the retaining spring illustrated in Fig. 2 and previously described.

From the foregoing description, taken in connection with the accompanying drawings, it will be noted that I have provided an exceedingly simple device by which the wear upon the bearings of a shaft or other moving part will be automatically taken up so that the machinery of which the moving part forms an element will be operated evenly and without excessive loss of power. My device will be found especially efficient when applied to the crank shafts of automobiles, the bearing members being mounted in the pitman and fitting around the pin of the crank as will be readily understood.

Having thus described the invention, what is claimed as new is,—

1. The combination of a shaft, bearing members fitting around the shaft, a support for said bearing members, opposed wedges mounted in the support and acting upon the bearing members to move them toward the shaft, springs secured on the support and engaging the outer ends of the wedges to move them in opposite directions, and a retarding device mounted in the support at the side of and engaging the wedges.

2. The combination of a shaft, bearing members therefor, a support for the bearing members, opposed wedges mounted in the support and acting upon the bearing members to move them to the shaft, said wedges being provided with notches in their sides, springs secured upon the support and engaging the outer ends of the wedges to move then in opposite directions, and a spring mounted in the support at one side of the wedges and provided with a tooth adapted to engage the notches in the sides of the wedges.

3. The combination of a shaft, bearing members fitting around the shaft, a support for said bearing members, opposed wedges inserted through said support and acting upon the bearing members to move them to the shaft, said wedges being provided on their outer ends with lugs having straight sides, and leaf springs each secured at one end upon the support and provided in its free end with a notch engaging the lug on the adjacent wedge.

4. The combination of a shaft, bearing members fitting around the shaft, a support for said bearing members, oppositely disposed wedges inserted through the support and arranged to effect movement of the bearing members toward the shaft, said wedges being provided upon their sides with a series of notches extending longitudinally with respect to the support, springs secured upon the outer opposite sides of the support and bearing upon the outer ends of the wedges to move them inwardly through the support, and a retaining spring having its ends engaging loosely within the support and provided between its ends on one face with a tooth adapted to engage the notches in the wedges.

In testimony whereof I affix my signature in presence of two witnesses.

MRS. ANNA C. HALMRAST. [L. S.]

Witnesses:
D. M. MACMILLAN,
C. L. HALMRAST.